United States Patent
Zhang et al.

(10) Patent No.: US 10,486,678 B2
(45) Date of Patent: Nov. 26, 2019

(54) ENGINE TORQUE ESTIMATE CORRECTION

(71) Applicant: Ford Global Technologies, LLC, Dearborn, MI (US)

(72) Inventors: Chen Zhang, Canton, MI (US); Mark Steven Yamazaki, Canton, MI (US); Yanan Zhao, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 15/662,926

(22) Filed: Jul. 28, 2017

(65) Prior Publication Data

US 2019/0031173 A1   Jan. 31, 2019

(51) Int. Cl.
   *B60W 10/08*   (2006.01)
   *B60W 20/00*   (2016.01)

(52) U.S. Cl.
   CPC ........ *B60W 10/08* (2013.01); *B60L 2240/423* (2013.01); *B60W 20/00* (2013.01); *B60W 2710/083* (2013.01)

(58) Field of Classification Search
   None
   See application file for complete search history.

(56) References Cited

U.S. PATENT DOCUMENTS

| | | | |
|---|---|---|---|
| 6,178,945 B1 | 1/2001 | Suzuki et al. | |
| 6,907,325 B1 * | 6/2005 | Syed | B60K 6/445 |
| | | | 701/22 |
| 7,788,024 B2 | 8/2010 | Livshiz et al. | |
| 8,138,703 B2 | 3/2012 | Heap et al. | |
| 8,155,815 B2 * | 4/2012 | Cawthorne | B60W 20/15 |
| | | | 701/33.7 |
| 2003/0100404 A1 * | 5/2003 | Matsumura | B60W 10/02 |
| | | | 477/124 |
| 2007/0132423 A1 * | 6/2007 | Ajima | H02P 6/10 |
| | | | 318/719 |
| 2013/0057186 A1 * | 3/2013 | Tanabe | H02P 23/30 |
| | | | 318/400.15 |
| 2013/0151089 A1 | 6/2013 | Kim | |
| 2018/0029590 A1 * | 2/2018 | Hashimoto | B60K 6/26 |

* cited by examiner

*Primary Examiner* — Thomas G Black
*Assistant Examiner* — Demetra R Smith-Stewart
(74) *Attorney, Agent, or Firm* — David B. Kelley; Brooks Kushman P.C.

(57) ABSTRACT

A table of engine torque correction factors is used to compensate for noise factors. In a hybrid vehicle, the motor is used to measure engine torque during periods of constant transmission input shaft torque. By comparing the measured input torque to the requested engine torque, a controller can update the table of correction factors to compensate for changes in the noise factors. A service procedure may be implemented that systematically provides the controller an opportunity to update many values in the table.

16 Claims, 4 Drawing Sheets

ENGINE TORQUE ESTIMATE CORRECTION

TECHNICAL FIELD

This disclosure related to the field of control of a hybrid electric vehicle. More particularly, the disclosure relates to a procedure for adapting engine torque correction factors.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

In order to reduce fuel consumption, some vehicles include hybrid powertrains which utilize energy storage to supplement the power produced by the internal combustion engine. These powertrains permit the vehicle to operate a portion of the time with the engine off and the remainder of the time at torque levels at which the engine is more efficient. Hybrid powertrains also enable the capture and later use of energy that would otherwise be dissipated by the braking system.

SUMMARY

A vehicle includes a motor, an internal combustion engine, and a controller. The motor is fixedly coupled to a transmission input shaft. The internal combustion engine is selectively coupled to the transmission input shaft by a clutch. The controller is programmed to respond to a driver torque demand at an input shaft speed by commanding the engine to generate a commanded engine torque, wherein the commanded engine torque is based on a stored torque correction factor. In an alternative embodiment, the commanded motor torque may be adjusted based on the correction factor to ensure delivery of the desired total torque. While operating the motor in a speed control mode at the input shaft speed with the clutch disengaged, the controller measures a first measured motor torque. Then, while operating the motor in the speed control mode at the input shaft speed with the clutch engaged, the controller commands the engine to generate a first commanded engine torque and measures a second measured motor torque. The controller updates the torque correction factor to a difference between the first measured motor torque and a sum of the commanded engine torque and the second measured motor torque. The torque correction factor may be stored in a table as a function of engine speed and engine torque and updated by replacing at least one value in the table. The motor torque may be measured during an operating condition in which transmission input shaft torque is constant. These operating conditions may occur during normal driving, such as idling, creeping, in park or neutral, or while driving with cruise control. An operator selected service procedure may systematically provide the operating condition.

A vehicle includes a motor, an internal combustion engine, and a controller. The motor is fixedly coupled to a transmission input shaft. The internal combustion engine is selectively coupled to the input shaft by a clutch. While operating the motor is a speed control mode with constant input shaft torque, the controller is programmed to measure a first measured motor torque with the clutch disengaged, engage the clutch, and command the engine to generate a commanded engine torque and measure a second measured motor torque. The controller may be further programmed to store an engine torque correction factor equal to a difference between the first measured motor torque and a sum of the second measured motor torque and the commanded engine torque. The controller may be further programmed to respond to a requested engine torque by commanding the engine to generate the commanded engine torque wherein the requested engine torque differs from the commanded engine torque by the torque correction factor. The controller may be further programmed to operate in a service mode in which torque correction factors are stored for a set of transmission input shaft speeds.

A vehicle includes a motor, an internal combustion engine, and a controller. The motor is fixedly coupled to a transmission input shaft. The internal combustion engine is selectively coupled to the input shaft by a clutch. In an operator selected service mode, the controller is programmed to command the motor to rotate at a first speed, measure a first measured motor torque with the clutch disengaged, and command the engine to generate a first commanded engine torque and measure a second measured motor torque with the clutch engaged. The controller may be further programmed to store a first engine torque correction factor equal to a difference between the first measured motor torque and a sum of the second measured motor torque and the first commanded engine torque. The controller may be further programmed to, in the service mode, command the engine to generate a second commanded engine torque, measure a third measured motor torque with the clutch engaged, and store a second engine torque correction factor equal to a difference between the first measured motor torque and a sum of the third motor measured torque and the second commanded engine torque.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
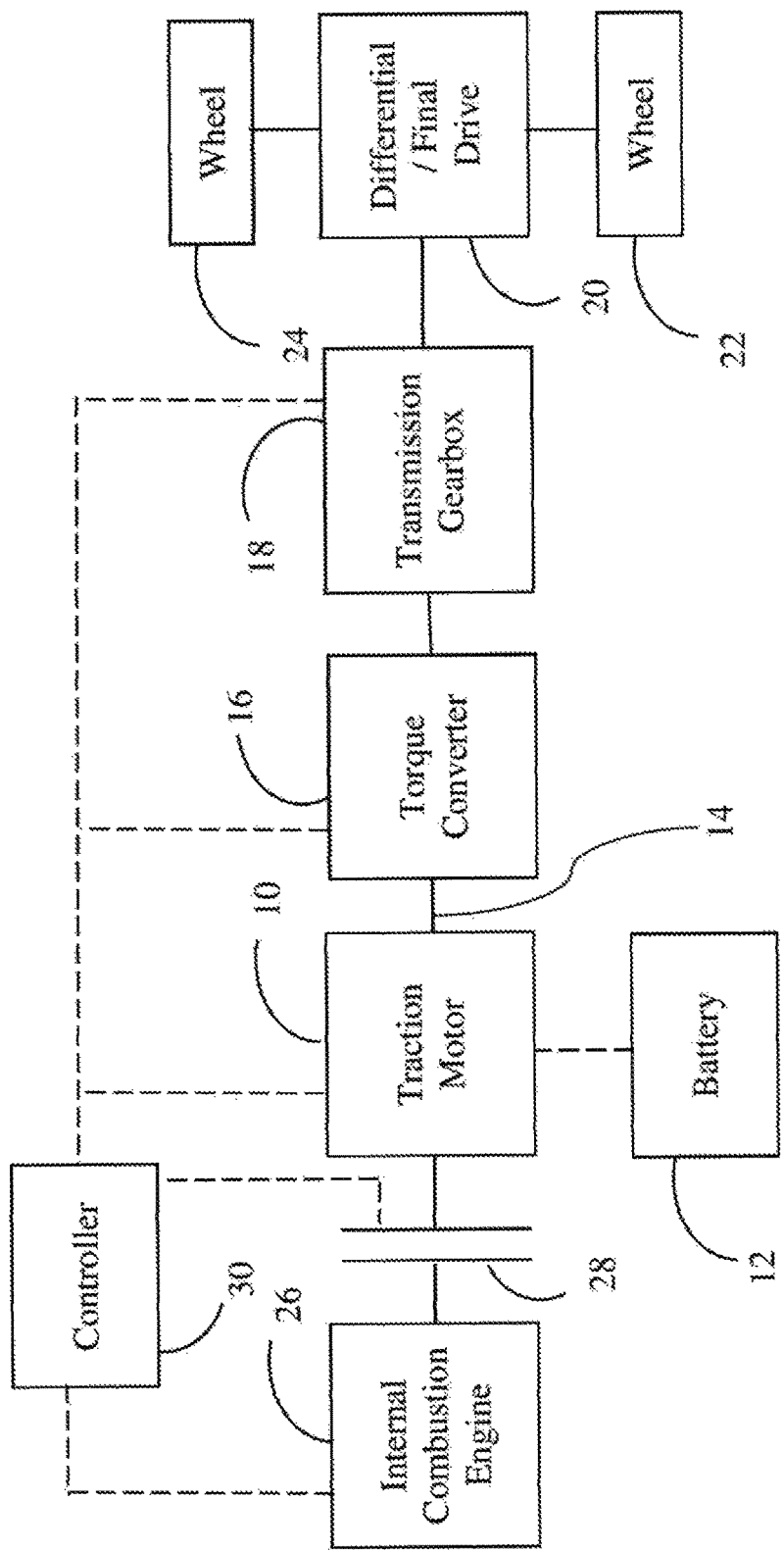
FIG. 1 is a schematic diagram illustrating a hybrid vehicle powertrain.

FIG. 1 schematically illustrates a hybrid vehicle powertrain. Traction motor 10 generates torque utilizing stored electrical energy from battery 12. In some operating modes, traction motor 10 may be operated to generate electrical power which is then stored in battery 12 for later use. The traction motor may be, for example, a synchronous AC motor in combination with an inverter. The rotor of traction motor 10 is fixed to transmission input shaft 14. Power from transmission input shaft 14 is conveyed to vehicle wheels via torque converter 16, gearbox 18, and differential 20.

Torque converter 16 includes an impeller fixedly connected to the transmission input shaft 14 and a turbine fixedly connected to the input of gearbox 18. Torque converter 16 transmits power from the impeller to the turbine whenever the impeller rotates faster than the turbine. Torque converter 16 may also include a stator which multiplies the torque such that the torque on the turbine is greater than the torque on the impeller. Torque converter 16 may also include a lockup clutch that selectively couples the impeller to the turbine for more efficient power transfer when the slip associated with the hydrodynamic power transfer between the impeller and turbine is not required.

Gearbox 18 includes several clutches and brakes that establish various power flow paths from the gearbox input shaft to the transmission output shaft. These power flow paths have different speed ratios. The transmission shifts from one power flow path to another power flow path by disengaging one or more clutches or brakes and engaging other clutches or brakes. A neutral mode is established in which no power flow path between the gearbox input and the transmission output exists. Gearbox 18 may also include a parking pawl that may be engaged to hold the transmission output stationary when the vehicle is unoccupied.

The transmission output shaft is connected to differential 20 which divides the power between left and right driven wheels 22 and 24. The differential permits slight speed differences between the wheels such as when the vehicle turns a corner.

Internal combustion engine 26 is selectively coupled to transmission input shaft 14 by clutch 28. Note that transmission input shaft 14 extends through traction motor 10. When clutch 28 is engaged, engine 26 and traction motor 10 rotate at the same speed and the torque on transmission shaft 14 is equal to the sum of the torque produced by engine 26 and the torque produced by traction motor 10. In some operating modes, engine 26 may provide all power for propulsion by setting the traction motor torque to zero. In other operating modes, the motor may draw power from battery 12 to assist in propelling the vehicle. In still other operating modes, the engine may produce more power than required for propulsion with the motor diverting some of the power to charge battery 12. When clutch 28 is disengaged, all propulsion is provided by traction motor 10.

The powertrain is controlled by controller 30. Controller 30 may be a single micro-processor or multiple communicating micro-processors. Controller 30 accepts commands from the driver via the accelerator pedal position, the brake pedal position, the position of the shift selector (PRNDL), etc. The controller also uses signals from various sensors. The controller controls engagement and disengagement of clutch 28, the torque converter lockup clutch, and the clutches and brakes within gearbox 18. The controller also sends commands to the engine 26 and to traction motor 10 indicating how much torque they should produce.

In some operating modes, controller 30 may operate traction motor 10 in a speed control mode in which the controller commands a particular speed. Some motors may implement this speed control directly, while others may implement the speed control mode using a feedback signal to adjust the torque command. In such a feedback system, such as a Proportional, Derivative, Integral (PDI) controller, the torque is adjusted as necessary to maintain the commanded speed. In the speed control mode, the controller may be able to measure the motor torque. When the speed control mode is implemented via feedback control, the torque is measured by noting the average torque command required to maintain the commanded speed. When the speed control mode is directly implemented, the controller may be able to calculate torque based on measurements of electrical current, voltage, and phase.

Unfortunately, the torque produced by the engine is not always equal to the torque commanded by the controller. A variety of noise factors can lead to the torque producing being less than or more than commanded. These noise factors include part to part variation and degradation over time. To significantly lesser extent, the motor torque is not always equal to the torque commanded by the controller. These torque delivery errors are most likely to be noticed by the vehicle occupants when the controller changes the relative proportion of engine torque and motor torque. Unless the driver changes the accelerator position, the driver expects the total transmission input torque to remain constant. However, due to engine torque delivery inaccuracy, the total transmission input torque may change.

Figure 2:
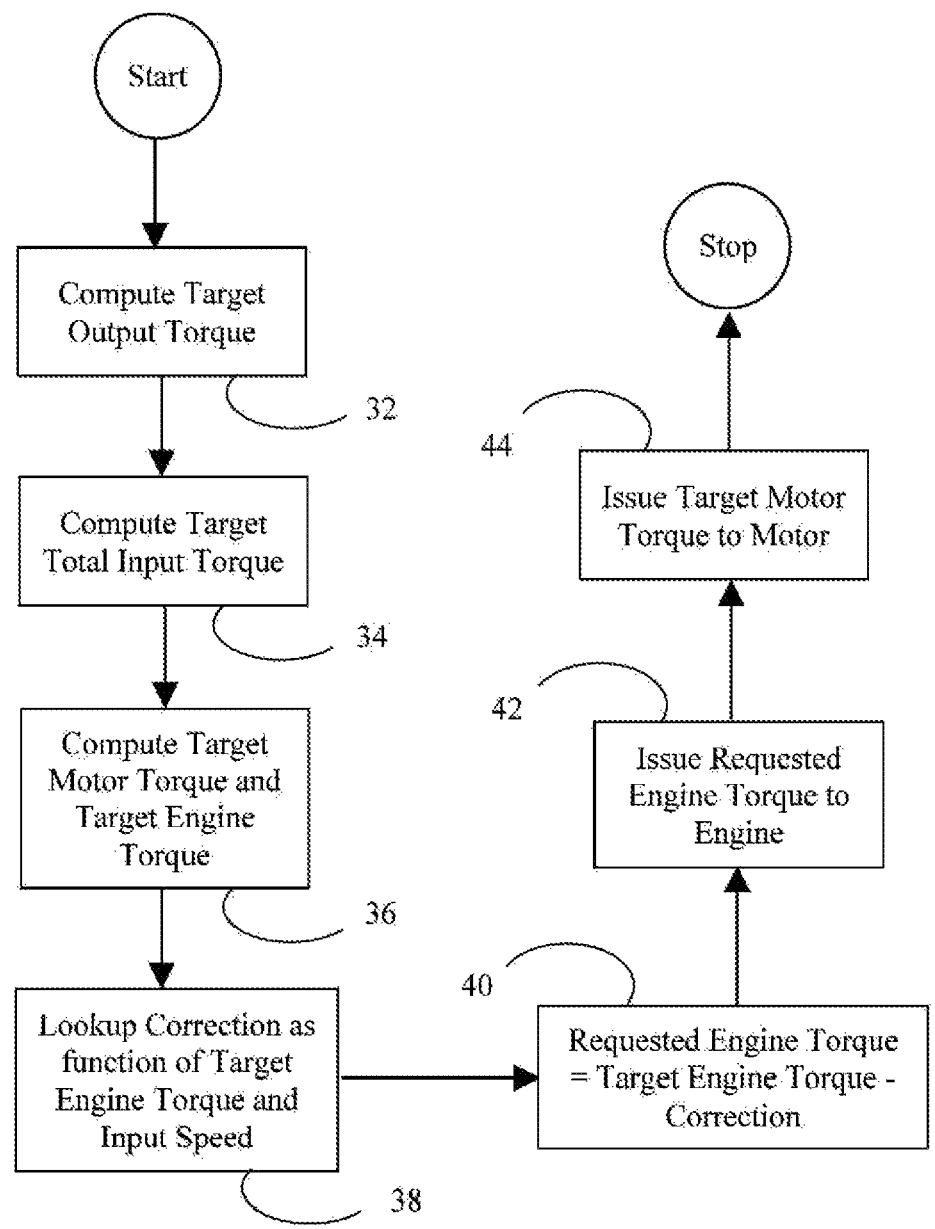
FIG. 2 is a flow chart for a method of method of controlling the internal combustion engine and traction motor of the powertrain of FIG. 1 using a table of correction factors.

To reduce the engine torque error, the controller may use a table of torque correction factors as illustrated in the process of FIG. 2. At 32, the controller computes the target output torque from the accelerator pedal position and the vehicle speed. At 34, the controller computes the total target transmission input torque based on the target output torque and the torque multiplication of the gearbox and the torque converter. At 36, the controller divides the target total transmission input torque into a target motor torque and a target engine torque. This may be based on several factors, including the engine efficiency characteristics, the current battery state of charge, etc. At 38, the controller looks up an engine torque correction factor as a function of the target engine torque and the current engine speed. The correction factors may be stored in a table. Interpolation may be required for engine speeds and target engine torques that fall between the tabulated values. At 40, a requested engine torque is calculated by subtracting the correction factor from the target engine torque. In an alternative embodiment, the correct factor may be used to adjust the commanded motor torque to ensure that the desired total torque is delivered. At 42, the controller sends a torque request equal to the requested engine torque to the engine. An engine controller may translate this torque request into throttle position, spark timing, injector settings, etc. and issue those requests to the appropriate actuators. If the engine controller is integrated into controller 30, then controller 30 will make these translations and the individual actuator commands should be regarded as issuing the torque request. At 44, the controller issues a torque request to the traction motor 10. A motor controller then translates the torque request into specific inverter settings.

As long as the correction factors in the lookup table accurately indicate the differences between the engine torque level requested and the torque delivered by the engine, then the engine will deliver the target engine torque. The correction factor lookup table may be initially populated when the vehicle is new based on measurements performed at the factory. To ensure that the tabulated correction factors continue to accurately reflect engine behavior as the noise factors change over time, it is advantageous to update the tabulated correction factors. Periodically updating the correction factors during normal vehicle operation corrects for changes due to gradual wear and seasonal changes. Following any maintenance that is likely to cause an abrupt change, it is desirable to perform a systematic updating procedure.

Figure 3:
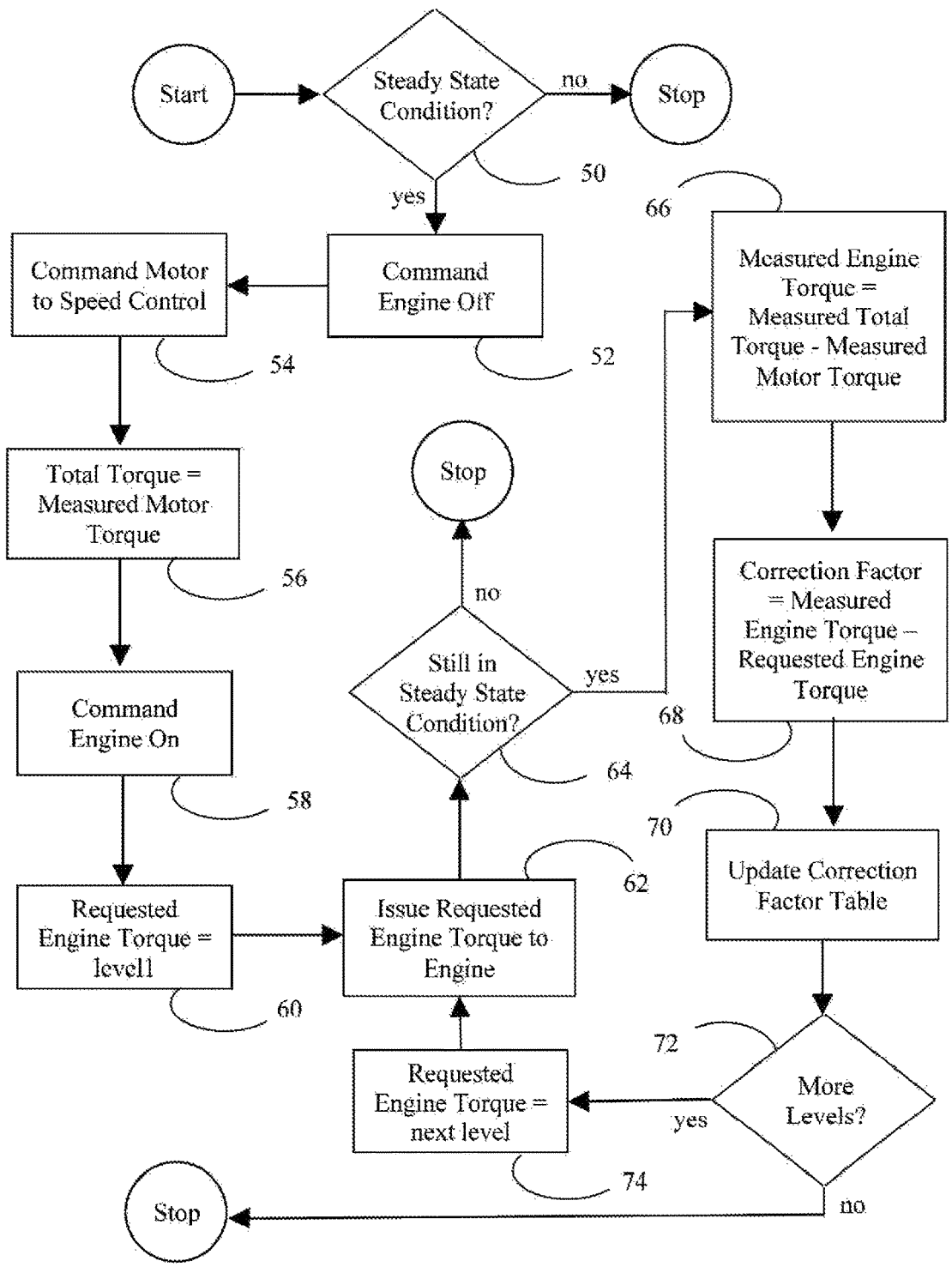
FIG. 3 is a flow chart for a first method of updating the table of correction factors.

A method for opportunistically updating the correction factors is illustrated by the flowchart of FIG. 3. At 50, the controller decides whether the current operating condition is a steady state condition. A steady state condition is characterized by constant transmission input shaft speed and constant transmission input shaft torque. Some examples of steady state conditions include:

Park or Neutral (transmission input shaft torque is negligible),
Idle with vehicle stationary (transmission input shaft torque is based on torque converter characteristic),
Creep on constant grade (transmission input shaft torque is based on torque converter characteristic and grade),
Cruise control on constant grade (transmission input shaft torque is based on grade, wind resistance, and rolling resistance),
Operation on a dynamometer wherein the dynamometer controls the speed.

At 52, the controller commands release of clutch 28 and commands the engine off. At 54, the controller commands traction motor 10 to operate in speed control mode. The speed commanded depends upon which steady state condition is detected at 50. For example, for park, neutral, or creep conditions, the motor may be commanded to a speed close to the engine's idle speed. In cruise control, the motor is commanded to the speed that results in the desired vehicle speed. At 54, the controller records the torque being produced by traction motor 10. This is treated as the total transmission input torque for this steady state operating condition. At 58, the controller commands the engine to be on and clutch 28 to be engaged. If traction motor 10 was temporarily operated in some other mode during the engine starting process, it is returned to speed control mode at the same commanded speed.

As the process continues, the torque is commanded to produce various levels of torque. These may be predetermined levels that are recorded in the table of correction factors. At 60, the requested engine torque is set to the first of these levels. At 62, the torque request is issued to the engine. At 64, the controller checks to see whether the steady state condition still persists. If not, the procedure exits. Since motor 10 is being operated in speed control mode, it adjusts its output torque such that the total of the engine torque and the motor torque is the same total torque recorded at 56. At 66, the measured engine torque is calculated by subtracting the measured motor torque from the previously recorded total torque. The new correction factor is calculated at 68 by subtracting the requested engine torque from the measured engine torque. At 70, the table of correction factors is updated.

Several methods are known for adaptively updating a lookup table. These include both stochastic adaptation methods and periodic adaptation methods. Stochastic adaptation methods update the values in the lookup table in response to individual observed results. One such method is described in European Patent Application EP 1 712 767 A1, which is incorporated by reference herein. When the observed result differs from the value estimated by the lookup table, the stored values for nearby values of the independent variables are modified such that a new dependent value for the observed independent variable is closer to the observed result. For stability, the adaptation may not allow large changes in a single update. In a periodic adaptation method, multiple observations are stored and then a curve fitting process is performed to calculate new values for model parameters. As with stochastic adaptation methods, there may be restrictions on the rate of adaptation and there may be boundaries beyond which adaptation is not permitted.

At 72, the controller checks whether more levels of engine torque should be checked. If not, the procedure ends and normal operation of the traction motor and engine resumes. If there are more levels, the requested engine torque is set to the next level at 74 and the process repeats starting at 62.

Treating the measured motor torque at 56 as the actual torque for the operating condition is advantageous even if there are unaccounted noise factors impacting motor torque delivery. This ensures that anytime that the controller transitions from motor only operation to motor plus engine operation, the total torque will be constant.

Updating the correction factor table opportunistically when vehicle operating conditions permit may not provide frequent opportunities to update the higher speed entries in the table. Consequently, it may be advantageous to periodically perform a systematic procedure for updating the table. This may be done, for example, following any service procedure that is likely to change the noise factors impacting engine torque levels.

Figure 4:
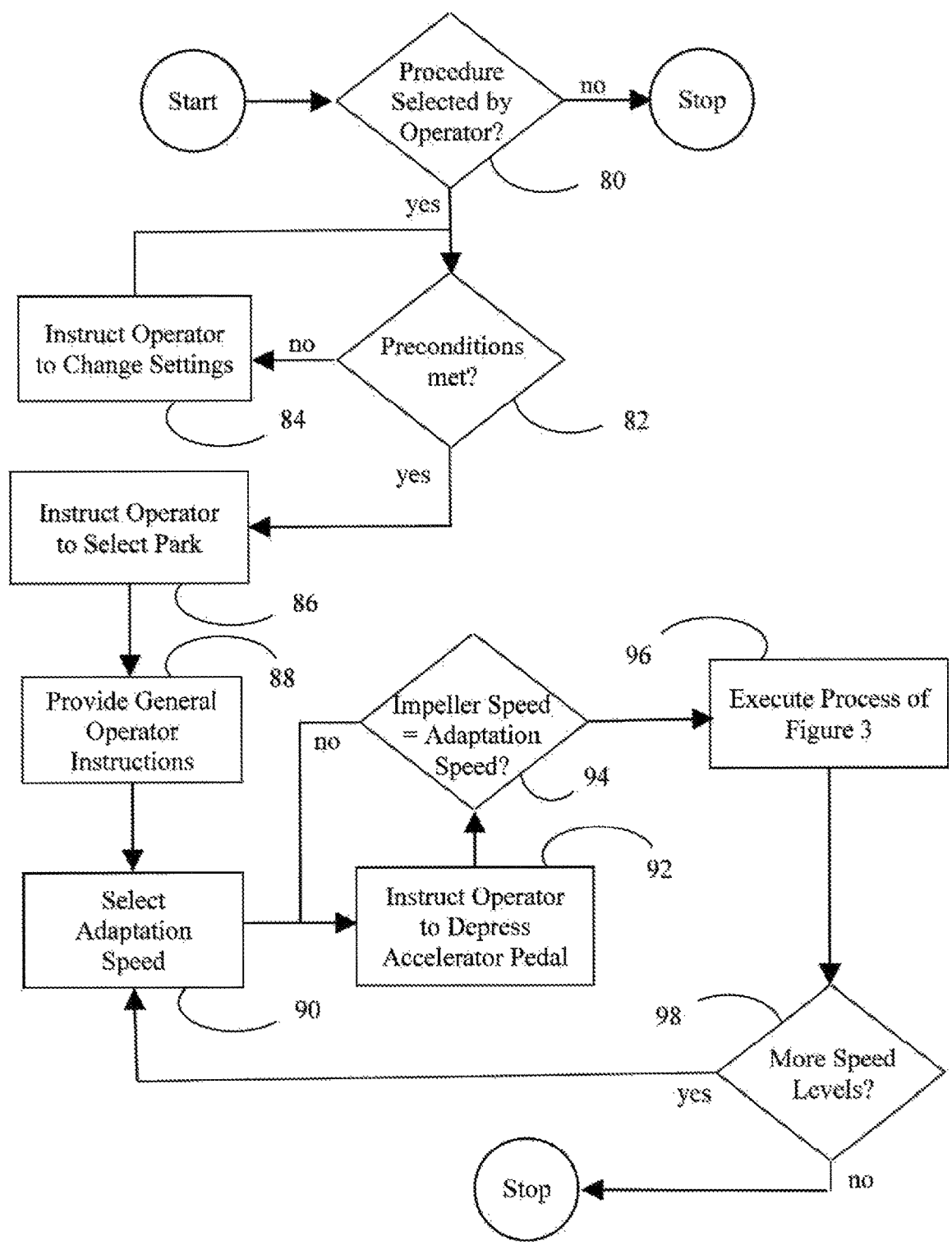
FIG. 4 is a flow chart for a second method of updating the table of correction factors.

A systematic update procedure is illustrated in FIG. 4. This procedure is actively selected by a vehicle operator, such as a service technician. A vehicle display may be used to lead the operator through the procedure. Alternatively, the operator may be instructed via voice commands from an audio system. At 80, the controller checks whether the procedure has been selected. It may be selected, for example, via menu choices in a driver interface. Alternatively, it may be selected by a sequence of manipulations of the brake pedal, accelerator pedal, shifter, etc. that would not normally occur during regular driving. If the procedure is selected, the controller checks at 82 whether a set of preconditions are satisfied. These preconditions may include whether or not the battery state of charge is sufficient for the motor only portions of the procedure while not being too high for the battery to absorb excess power generated during other portions of the procedure. Also, vehicle settings that may alter the torque delivered by the engine to the transmission must be avoided. So, for example, if the air conditioning is on, the driver is instructed at 84 to turn it off.

Once all preconditions are met, the operator is instructed, at 86 to place the vehicle in Park, if it is not already in Park. Alternatively, the procedure could be performed in Neutral. At 88, the controller provides additional general instructions to the operator in preparation for the procedure. At 90, the controller decides what engine speed to update. If multiple speeds are to be updated, the controller selects the first one. At 92, the controller instructs the operator to depress the accelerator pedal to raise the impeller speed. Requiring this type of operator interaction ensures that an operator is present during the procedure. At 94, the controller checks whether the impeller speed matches the chosen adaptation speed, within some tolerance, and continues instructing the operator until the speeds match. At 96, the controller executes the process of FIG. 4, which cycles the engine commanded engine torque through a number of levels and updates the table of correction factors for those levels. At 98, the controller determines if the table should be updated at additional speed levels. If so, control passes to 90 to update the table at those levels. If not, the procedure ends and normal operation resumes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a motor fixedly coupled to a transmission input shaft;
   an internal combustion engine selectively coupled to the input shaft by a clutch; and
   a controller programmed to
      in response to a driver torque demand at an input shaft speed, commanding the engine to generate a commanded engine torque, wherein the commanded engine torque is based on a stored torque correction factor,
      while operating the motor in a speed control mode at the input shaft speed with the clutch disengaged, measure a first measured motor torque,
      while operating the motor in the speed control mode at the input shaft speed with the clutch engaged, command the engine to generate a first commanded engine torque and measure a second measured motor torque, and
      update the torque correction factor to a difference between the first measured motor torque and a sum of the commanded engine torque and the second measured motor torque.

2. The vehicle of claim 1 wherein the torque correction factor is stored in a table as a function of engine speed and engine torque and wherein updating the correction factor comprises replacing at least one value in the table.

3. The vehicle of claim 1 wherein operating the motor in the speed control mode comprises commanding the motor to develop a commanded motor torque and adjusting the commanded motor torque based on a measured speed to maintain the input shaft speed and wherein measuring motor torque comprises noting the commanded motor torque that stabilizes the measured speed at the input shaft speed.

4. The vehicle of claim 1 wherein measuring the first and second measured motor torque occur during an operating condition in which transmission input shaft torque is constant.

5. The vehicle of claim 4 further comprising a torque converter having an impeller fixed to the transmission input shaft and a turbine driveably connected to vehicle wheels in the operating condition.

6. The vehicle of claim 5 wherein the vehicle wheels are stationary in the operating condition.

7. The vehicle of claim 4 wherein the transmission input shaft torque is set by a cruise control feature in the operating condition.

8. The vehicle of claim 4 wherein the transmission input shaft is not driveably connected to vehicle wheels in the operating condition.

9. The vehicle of claim 8 wherein the operating condition is established as part of an operator selected service mode.

10. A method comprising:
    in response to a driver torque demand at an input shaft speed, commanding an engine to generate a first commanded engine torque based on a stored correction factor;
    while operating the motor in a speed control mode at the input shaft speed with a constant transmission input shaft torque, generate a motor torque while commanding the engine to generate the first commanded engine torque; and
    in response to the driver torque demand at the input shaft speed, commanding the engine to generate a second commanded engine torque different than the first commanded engine torque based on the correction factor, wherein the correction factor is updated based on the commanded engine torque, the motor torque, and the constant input shaft torque.

11. The method of claim 10 wherein the constant input shaft torque is measured by operating the motor in a speed control mode at the input shaft speed at the constant transmission input shaft torque while the engine is decoupled from the transmission input shaft by a clutch.

12. The method of claim 10 wherein the updated correction factor is equal to a difference between the constant input shaft torque and a sum of the commanded engine torque and the motor torque.

13. The method of claim 10 wherein the constant input shaft torque results from placing a gearbox in a neutral state.

14. A vehicle comprising:
    a motor fixedly coupled to a transmission shaft;
    an internal combustion engine selectively coupled to the shaft by a clutch; and
    a controller programmed to, in an operator selected service mode,
       command the motor to rotate at a first speed,
       with the clutch disengaged, measure a first measured motor torque,
       with the clutch engaged, command the engine to generate a first commanded engine torque and measure a second measured motor torque, and
       store a first engine torque correction factor equal to a difference between the first measured motor torque and a sum of the second measured motor torque and the first commanded engine torque.

15. The vehicle of claim 14 wherein the controller is further programmed to, in the service mode, command the engine to generate a second commanded engine torque, measure a third measured motor torque with the clutch engaged, and store a second engine torque correction factor equal to a difference between the first measured motor torque and a sum of the third motor measured torque and the second commanded engine torque.

16. The vehicle of claim 14 wherein the controller is further programmed to, in the service mode,
    command the motor to rotate at a second speed,
    with the clutch disengaged, measure a fourth measured motor torque,
    with the clutch engaged, command the engine to generate a third commanded engine torque and measure a fifth measured motor torque, and
    store a third engine torque correction factor equal to the difference between the fourth measured motor torque and a sum of the fifth measured motor torque and the third commanded engine torque.

* * * * *